(12) United States Patent
Everett

(10) Patent No.: US 8,960,533 B2
(45) Date of Patent: Feb. 24, 2015

(54) USING BAR-CODES IN AN ASSET STORAGE AND TRANSFER SYSTEM

(71) Applicant: Royal Canadian Mint/Monnaie Royale Canadienne, Ottawa (CA)

(72) Inventor: David Everett, Rustington (GB)

(73) Assignee: Royal Canadian Mint/Monnaie Royale Canadienne, Ottawa, ON ( * ) Notice: Subject to any disclaimer, the term of this patent is extended or adjusted under 35 U.S.C. 154(b) by 0 days.

(21) Appl. No.: 13/845,789

(22) Filed: Mar. 18, 2013

(65) Prior Publication Data

US 2013/0240621 A1    Sep. 19, 2013

Related U.S. Application Data

(60) Provisional application No. 61/612,770, filed on Mar. 19, 2012.

(51) Int. Cl.
| | |
|---|---|
| G06Q 20/34 | (2012.01) |
| G06Q 40/02 | (2012.01) |
| G06Q 20/10 | (2012.01) |
| H04W 12/00 | (2009.01) |

(52) U.S. Cl.
CPC ............ *G06Q 40/02* (2013.01); *G06Q 20/3433* (2013.01); *G06Q 20/105* (2013.01); *H04W 12/00* (2013.01)
USPC ......................................................... 235/375

(58) Field of Classification Search
USPC .......... 235/379, 380, 462.01, 462.45, 472.01, 235/462.09, 462.15; 705/26.1, 16, 39, 44, 705/1.1, 35; 455/405, 414, 2, 406, 456.6, 455/556.1, 566, 566.2
See application file for complete search history.

(56) References Cited

U.S. PATENT DOCUMENTS

| | | | | |
|---|---|---|---|---|
| 6,394,343 | B1 * | 5/2002 | Berg et al. | ...................... 235/379 |
| 8,616,453 | B2 * | 12/2013 | Itwaru | ...................... 235/462.01 |
| 2003/0230630 | A1 | 12/2003 | Whipple et al. | |

(Continued)

FOREIGN PATENT DOCUMENTS

| | | |
|---|---|---|
| WO | 2011032257 A1 | 3/2011 |
| WO | 2011032271 A1 | 3/2011 |

OTHER PUBLICATIONS

Gao, J. et al., "A 2D Barcode-Based Mobile Payment System", 2009 Third International Conference on Multimedia and Ubiquitous Engineering, IEEE, Jun. 4-6, 2009 (Jun. 4, 2009 to Jun. 6, 2009), pp. 320 to 329.

(Continued)

*Primary Examiner* — Christle I Marshall
(74) *Attorney, Agent, or Firm* — Kent Daniels; Daniels IP Services Ltd.

(57) ABSTRACT

A secure asset storage and transfer system. A first display displays a first bar code encoding a request message including an asset value amount to be transferred. A first camera-equipped device is configured for: reading the first bar code, decoding the first bar code to recover the request message; generating a value transfer message for transferring asset value amount to be transferred from a storage medium associated with the camera-equipped device; encoding the value transfer message to generate a corresponding second bar code; and displaying the second bar code on a second display. A second camera-equipped device is configured for reading the second bar code, and decoding the second bar code to recover the value transfer message.

13 Claims, 4 Drawing Sheets

(56) References Cited

U.S. PATENT DOCUMENTS

| | | | |
|---|---|---|---|
| 2004/0059672 A1* | 3/2004 | Baig et al. | 705/40 |
| 2007/0255653 A1* | 11/2007 | Tumminaro et al. | 705/39 |
| 2010/0125509 A1 | 5/2010 | Kranzley et al. | |
| 2012/0150669 A1* | 6/2012 | Langley et al. | 705/16 |
| 2012/0209749 A1* | 8/2012 | Hammad et al. | 705/27.1 |
| 2013/0256421 A1* | 10/2013 | Johnson et al. | 235/494 |
| 2014/0054367 A1* | 2/2014 | Alexeev | 235/375 |

OTHER PUBLICATIONS

International Search Report issued on Applicant's corresponding International PCT Application PCT/CA2013/050222 dated May 9, 2013.

* cited by examiner

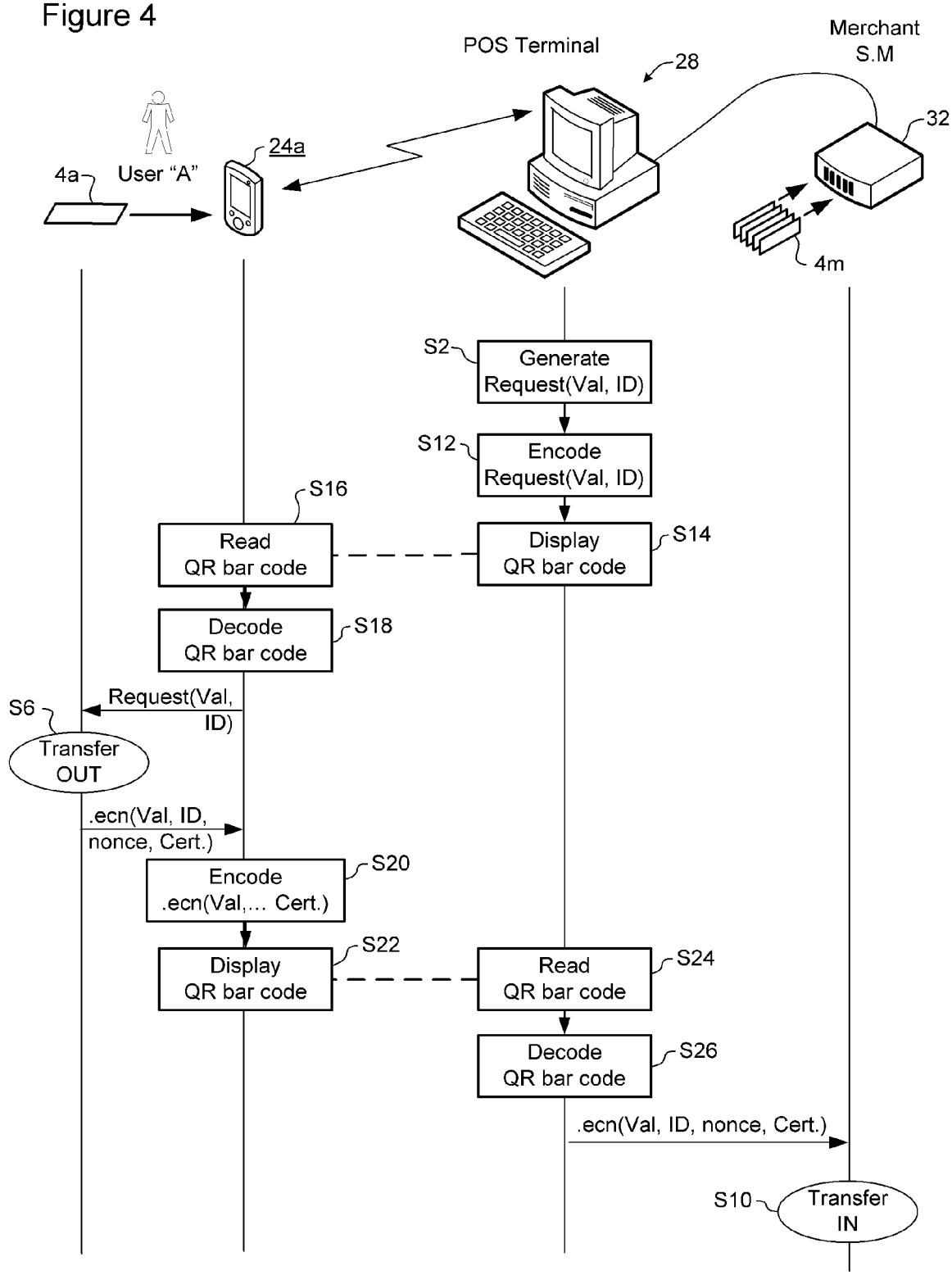

USING BAR-CODES IN AN ASSET STORAGE AND TRANSFER SYSTEM

CROSS REFERENCE TO RELATED APPLICATIONS

This application is based on, and claims benefit of, provisional U.S. patent Application No. 61/612,770 filed Mar. 19, 2012, the entire content of which is hereby incorporated herein by reference.

TECHNICAL FIELD

The present invention relates to a system for making payments by securely moving assets between the stores held by the participants in the system, and in particular to methods and systems utilizing Bar-Codes in an asset storage and transfer system.

BACKGROUND

Referring to FIG. 1, an asset storage and transfer system 2 in accordance with Applicant's PCT patent publications Nos. WO 2011/032257 and WO 2011/032271, the entire content of both publications is hereby incorporated herein by reference, comprises at least two storage media 4 configured to exchange messages through a communications medium 6. Each storage media 4 comprises an input/output (I/O) interface 8 configured to enable the storage media 4 to send and receive messages through the communications medium 6; a controller 10 responsive to received messages to record transfers of content to the storage media 4 and to transfer content from the storage media 4; and a memory 12 storing a respective unique identifier 14 of the storage media 4, a private key 16 and a certificate 18 uniquely assigned to the storage media 4, a log 20 of content transfers to and from the storage media 4, and a current value (Cur.Val) 22 of the storage media.

The private key 16 and a certificate 18, facilitate encryption and digital signature functionality using, for example, well-known Public Key Infrastructure (PKI) techniques. For the purpose, the private key 16 and the certificate 18 will typically be generated by a trusted Issuing Authority, such as, for example, Verisign™.

It is anticipated that the storage media 4 may be constructed as a physical device suitable for distribution and use by an individual person. Multiple such devices may be used by a merchant, for example. The storage media 4 may be configured to connect to a user's communications device 24 for communications through a data network 26, as shown in FIG. 1b. Such a personalized storage media 4 may be manufactured in any suitable form-factor, including, but not limited to, form factors commonly used in smart-cards, USB flash drives or memory cards. The I/O Interface 8 can be provided as any suitable communications link, such as, for example, a Universal Serial Data (USB) or mini-USB connection, a Blue-Tooth™ or Infra-red wireless connection. Other connection technologies may be used, as desired. Preferably, the I/O interface 8 is designed to enable the user to easily and reliably connect and disconnect their storage media 4 to and from a communications device 24, and, when connected, facilitate secure transfer of information between the storage media 4 and the communication device. For this reason, in embodiments in which a wireless interface technology is used, it is preferable that the wireless connection be operative over a very limited distance (e.g. on the order of 10 cm or less), so as to reduce power requirements and enhance security. Various known radio-frequency electromagnetic or magnetic coupling techniques may be used to implement a wireless connection at this distance.

The controller 10 and memory 12 may, for example, be constructed as a secure module 30 using known Subscriber Identity Module (SIM) techniques. However, this is not essential. Preferably, the storage media 4 is configured in such a manner that the controller 10 and memory 12 cannot be removed from the storage media 4 without destroying the controller 10 and memory 12. Use of SIM technology for construction of the controller 10 and memory 12 is beneficial, in that it enables the ID 14, Private Key 16 and certificate 18 to be permanently stored in the storage media 4 in such a manner that it is never destroyed (without destroying the functionality of the entire token, which is inconvenient to the user, but maintains security) and it is not practical to "hack" or reverse engineer the storage media 4 to discover the Private Key 16 or modify any of the log 20, the current content (Cur.Val) 22 or the operation of the storage media 4. As a result, each user of the system 2 has a good reason to believe that the association between the ID 14, Private Key 16 and Certificate 18 of any given storage media 4 is unique, and cannot be fraudulently duplicated.

The communication device 24 may take any suitable form, including, but not limited to, Personal Computers (PCs), note-book PCs, Personal Digital Assistants (PDAs), cell phones, smart-phones, point-of-sale machines etc.

The system of FIGS. 1a-b, enables the secure and reliable transfer of asset value amounts between users, who may comprise individual persons and/or merchants. Thus, for example, FIG. 2 illustrates a possible scenario in which a point of sale terminal 28 is connected to a data network 26 to enable a user "A" to make on-line purchases, and is further connected to a reader 30 to enable a user "B" to complete in-store purchases. The point of sale terminal 28 may also be connected to a merchant box 32 which is designed to receive one or more storage media 4 owned by the merchant. With this arrangement, users A and B can complete purchase transactions using their respective storage media to transfer the appropriate asset value amounts to the merchant.

A limitation of this approach, however, is that in order for the merchant's point of sale terminal 28 to be able to complete in-store purchases, the merchant must obtain a reader 30 capable of interacting with customers' storage media 4. In some cases merchants may be reluctant to incur this expense.

Techniques for addressing this limitation are desired.

SUMMARY

An aspect of the present invention provides, in a secure asset storage and transfer system comprising a first and second storage media configured to securely store and transfer asset value, a method of enabling secure exchange of asset value from the first storage media to the second storage media. The first storage media is controlled to generate a value transfer message for transferring a selected asset value amount. The value transfer message is encoded using a bar-code encoding scheme to generate a corresponding bar code. The bar code is displayed on a display, and read from the display. The read bar code is decoded to recover the value transfer message. The second storage media is then controlled to receive the recovered value transfer message.

A further aspect of the present invention provides a secure asset storage and transfer system. A first display displays a first bar code encoding a request message including an asset value amount to be transferred. A first camera-equipped device is configured for: reading the first bar code, decoding the first bar code to recover the request message; generating a value transfer message for transferring asset value amount to be transferred from a storage medium associated with the camera-equipped device; encoding the value transfer message to generate a corresponding second bar code; and displaying the second bar code on a second display. A second camera-equipped device is configured for reading the second bar code, and decoding the second bar code to recover the value transfer message.

BRIEF DESCRIPTION OF THE DRAWINGS

Further features and advantages of the present invention will become apparent from the following detailed description, taken in combination with the appended drawings, in which:

FIG. 4 is a flow diagram showing a representative payment transaction in the system of FIG. 2 using barcodes.

It will be noted that throughout the appended drawings, like features are identified by like reference numerals.

DETAILED DESCRIPTION

As is known in the art, Quick-Response (QR) bar codes provide a means of encoding information that can be quickly and reliably scanned and read by suitable scanning devices. Recently, QR bar codes have become increasingly popular in printed advertising media, because camera-equipped smartphones are readily capable of reading these codes. The present invention leverages this capability to enable the generation and transfer of value transfer messages without the requirement for wireless communications links or special-purpose readers.

Figure 1A:
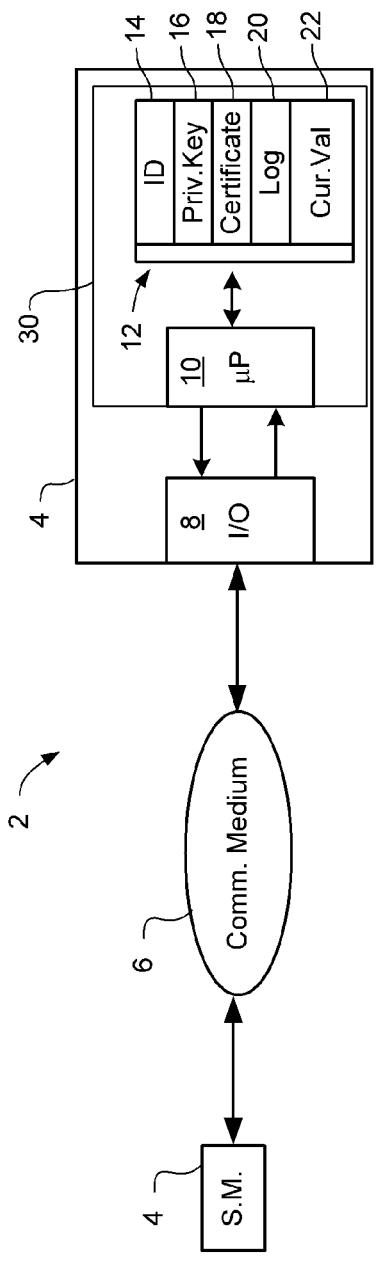
FIGS. 1a and 1b are a block diagrams schematically illustrating an asset storage and transfer system.
Figure 1B:
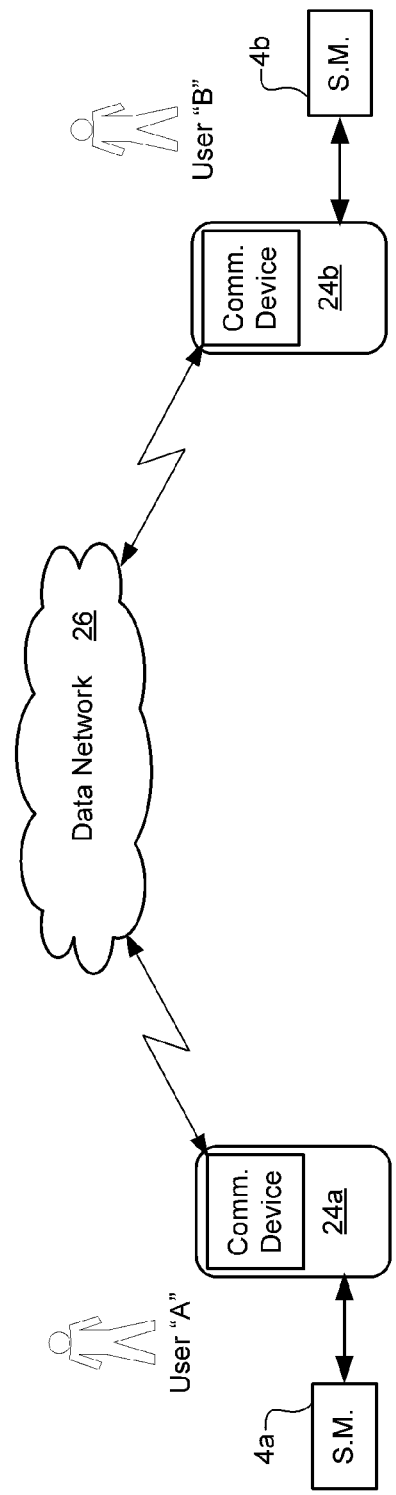
Figure 2:
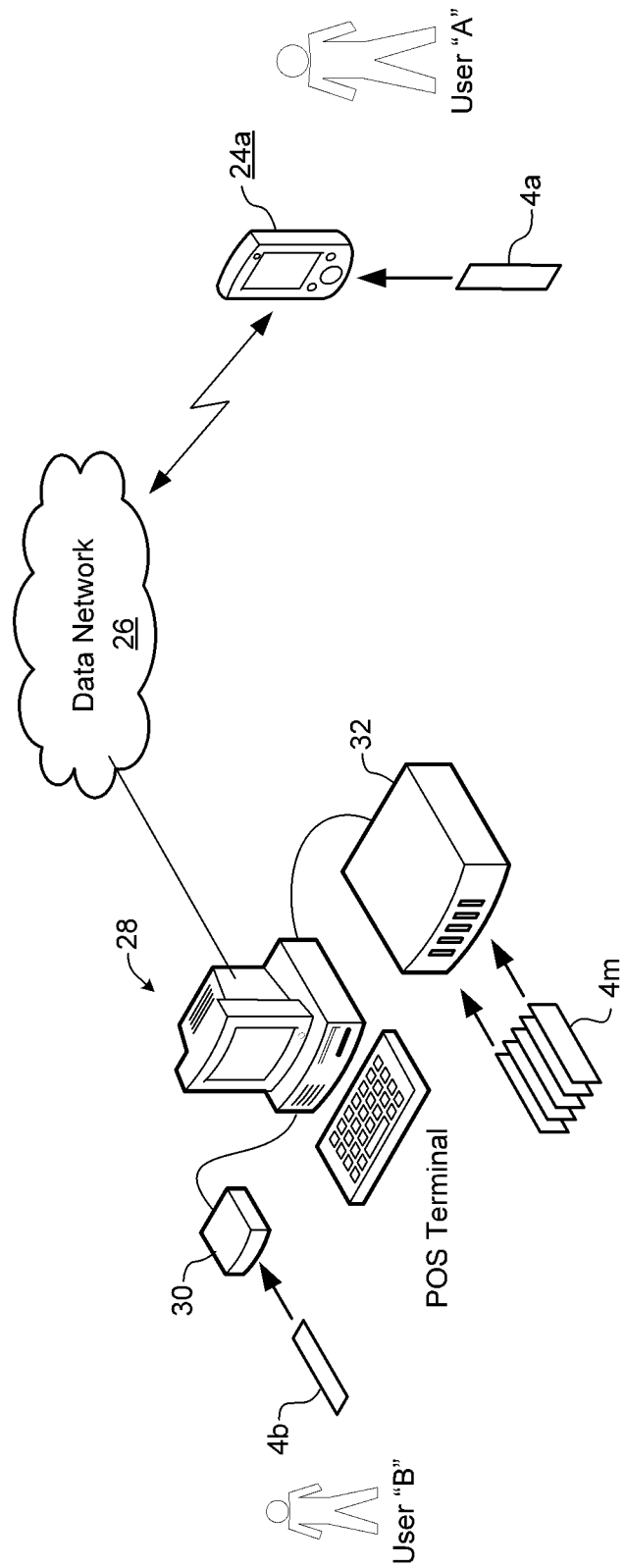
FIG. 2 is a block diagram schematically illustrating an asset storage and transfer system incorporating a merchant's Point of Sale (POS) terminal.
Figure 3:
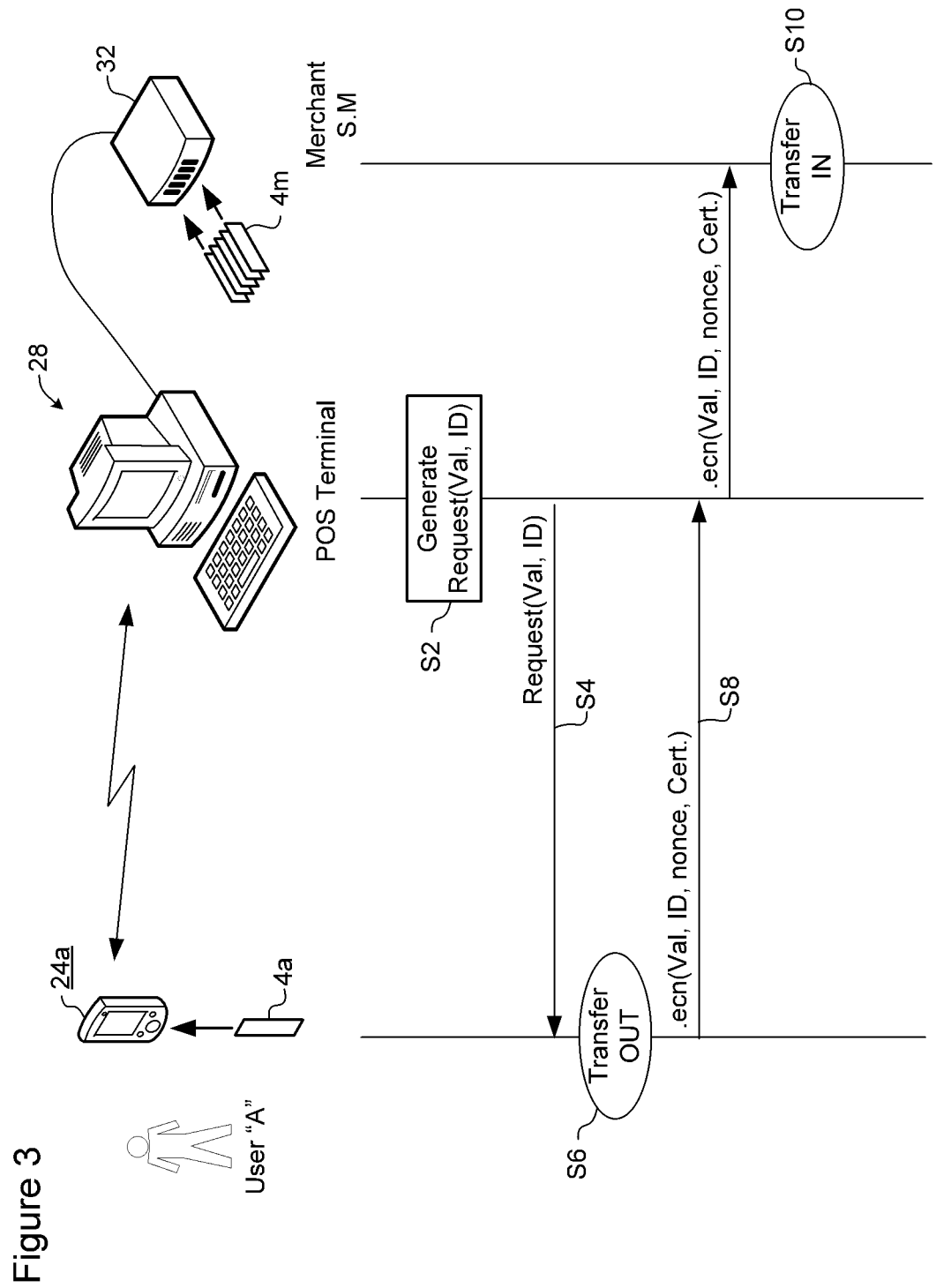
FIG. 3 is a flow diagram showing a representative payment transaction in the system of FIG. 2 using a wireless connection between a user's communications device and the POS terminal.

Referring to FIG. 3, Applicant's PCT patent publications Nos. WO 2011/032257 and WO 2011/032271 describe a transaction scenario in which the merchant system 28 generates a request message (at S2) containing the identifier (ID) of the merchant's storage media and an amount (Val.) to be transferred, and sends (at S4) this request message (eg via a wireless link) to the customer's communication device and/or storage media 4. The customer may then use their communication device to execute a Transfer-Out process (at S6) to generate a value transfer message containing the asset value to be transferred (Val), the identifier (ID) of the merchant's storage media, and security information. The customer then uses their communication device to forward (at S8) the value transfer message to the merchant system 28 which executes a Transfer-In process (at S10) to store the asset value in the merchant's storage media to complete the transaction. The present invention enables this scenario to be replicated using camera-equipped communications devices and visually encoded information such as QR bar codes or the like.

FIG. 4 illustrates a representative embodiment in which the request message generated by the merchant system 28 (at S2) in the manner described above may be encoded (at S12) to generate a QR bar code, which may then be displayed (at S14) in any of a variety of forms. In some embodiments, the QR bar code may be displayed on a display monitor of the Point of sale terminal, but this is not essential. Preferably, the customer can use a camera-equipped communication device to read the QR bar code (at S16) and decode the QR bar code (at S18) to thereby obtain the request message including the identifier of the merchant's storage media. The customer may then use their communication device to execute a Transfer-Out process (at S6) to generate a value transfer message containing the asset value to be transferred (Val), the identifier (ID) of the merchant's storage media, and security information. The customer's communication device may encode the value transfer message (at S20) as one or more QR bar codes, which may then be displayed (at S22) on a display monitor of the customer's communication device. The merchant may then use any suitable scanner to read the QR bar code(s) directly from the customer's communication device display (at S24). Decoding the QR bar code(s) (at S26) enables recovery of the value transfer message, so that the merchant system 28 can executes a Transfer-In process (at S10) to store the asset value in the merchant's storage media to complete the transaction.

In some scenarios, the request message sent from the POS terminal 28 does not contain the asset value amount to be transferred, which must be input by the customer (User A) into their communication device 24. In these scenarios, the request message generated by the POS terminal 28 is effectively generic, in that it's content does not change from one transaction or customer to the next. For these situations, the merchant may choose to display the QR bar code encoding the request message on an advertisement, poster or other signage accessible to the customer, so that they may use their communications device to read and decode the request message as required. The customer can subsequently execute the transfer-out process (step S6) to generate the value transfer message, which may then be transferred to the merchant's system 28 as described above with reference to FIG. 4.

In some embodiments, the QR bar code encoding scheme is capable of encoding all of the information of a value transfer message within a single QB bar-code image. However, this is not essential. If desired, two or more QR bar code images may be used to convey the information content of a single value transfer message. In this case, various means may be used to divide the content of the value transfer message into blocks, each of which has a size that is suitable for encoding within a single QR bar code image. For example, a value transfer message having a length of 256 Bytes, may be divided into four blocks of 64 Bytes each. Each block may then be encoded to generate a respective QR bar code image. In order to recover the value transfer message (for example in the merchant's system 28, all of the QR bar code images must be read and decoded, and the resulting decoded blocks combined in order to reconstruct the original value transfer message. In some embodiments, reassembly of the value transfer message is facilitated by encoding each block with a respective identifier that indicates that block's location within the value transfer message. During the decoding operation, the respective identifiers of each block can be used to ensure that the blocks are arranged in the correct order within the recombined value transfer message.

Naturally, the above described methods may also be used in other scenarios, for example for asset value transfers between two individual users. In the scenario described above with reference to FIG. 4, a Merchant's POS terminal 28 and a user's communication device 24 use QR codes to send and receive the request and value transfer messages. However, it will be appreciated that the present invention is not limited to such devices. More generally, the above described methods may also be used for exchanging asset value amounts between any of a wide variety of camera-equipped communication devices that are capable of reading bar-codes. Only the communications device that generates and sends the value transfer message must be capable of encoding that value transfer message as a bar code and displaying the barcode on a display screen in a manner that can be read by another device.

The above description focuses on the use of QR bar codes, because these are well known in the art and provide a convenient solution. However, any scheme that encodes information into an image that can be displayed and read using a camera-equipped communication device may be used. It is contemplated that numerous encoding schemes are known, or may be developed in future that will serve this purpose and may be used without departing from the intended scope of this application.

The above description describes a scenario in which the merchant POS terminal 28 displays a first bar-code encoding the request message on a display screen of the POS terminal 28, so that it can be read by the user's camera-equipped communication device 24a. In this case, the display screen of the POS terminal 28 is an electronic display screen. However, it will appreciated that this is not essential. For example, a bar code encoding the request message could be displayed on a static display such as a sign or a label (or any other suitable media) such that it can be read by the user's camera-equipped communication device 24a.

The embodiment(s) of the invention described above is(are) intended to be exemplary only. The scope of the invention is therefore intended to be limited solely by the scope of the appended claims.

The invention claimed is:

1. In a secure asset storage and transfer system comprising a first and second storage media configured to securely store and transfer asset value, a method of enabling secure exchange of asset value from the first storage medium to the second storage medium, the method comprising:
   a first device operating to:
      cause the first storage medium to generate a value transfer message for transferring a selected asset value amount from the first storage medium to the second storage medium;
      encode the value transfer message using a barcode encoding scheme to generate a corresponding bar code; and
      display the bar code on a display of the first device;
   a second device operating to:
      read the bar code from the display of the first device;
      decode the read bar code to recover the value transfer message; and
      cause the second storage medium to process the recovered value transfer message to receive the selected asset value amount.

2. The method of claim 1, wherein the bar code is a Quick Response (QR) bar code.

3. The method of claim 1, further comprising steps of:
   generating a request message including an asset value amount to be transferred;
   encoding the request message using a barcode encoding scheme to generate a corresponding request bar code;
   displaying the request bar code such that the bar code can be read by a camera-equipped device.

4. The method of claim 3, wherein the step of displaying the request bar code comprises displaying the request bar code on an electronic display screen.

5. The method of claim 3, wherein the step of displaying the request bar code comprises displaying the request bar code on a static display.

6. A system comprising:
   a first display displaying a first bar code encoding a request message including an asset value amount to be transferred;
   a first camera-equipped device configured to:
      read the first bar code,
      decode the first bar code to recover the request message;
      cause a first storage medium to generate a value transfer message for transferring the asset value amount to be transferred from the first storage medium to a second storage medium;
      encode the value transfer message to generate a corresponding second bar code; and
      display the second bar code on a second display; and
   a second camera-equipped device configured to:
      read the second bar code;
      decode the second bar code to recover the value transfer message; and
      cause the second storage medium to process the recovered value transfer message to receive the selected asset value amount.

7. The system of claim 6, wherein the first bar code is a Quick Response (QR) bar code.

8. The system of claim 6, wherein the first display is any one or more of a static display and an electronic display screen.

9. The system of claim 6, wherein the second camera-equipped device includes the first display.

10. The system of claim 6, wherein the first display is remote from the second camera-equipped device.

11. The system of claim 6, wherein the first camera-equipped device is a mobile device.

12. The system of claim 6, wherein the second camera-equipped device is a mobile device.

13. The system of claim 6, wherein the second camera-equipped device is a point of sale terminal.

* * * * *